United States Patent
Oguma et al.

(10) Patent No.: US 9,584,680 B2
(45) Date of Patent: Feb. 28, 2017

(54) FUNCTION PROVIDING SYSTEM AND RECORDING MEDIUM FOR USING FUNCTIONS PROVIDED BY SERVER

(71) Applicant: KYOCERA Document Solutions Inc., Osaka (JP)

(72) Inventors: Takashi Oguma, Osaka (JP); Masafumi Sato, Osaka (JP); Zhen yu Sun, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/049,829

(22) Filed: Feb. 22, 2016

(65) Prior Publication Data
US 2016/0255215 A1 Sep. 1, 2016

(30) Foreign Application Priority Data
Feb. 27, 2015 (JP) ................. 2015-039559

(51) Int. Cl.
*H04N 1/04* (2006.01)
*H04N 1/00* (2006.01)

(52) U.S. Cl.
CPC ...... *H04N 1/00244* (2013.01); *H04N 1/00854* (2013.01); *H04N 1/00856* (2013.01); *H04N 1/00938* (2013.01); *H04N 2201/0094* (2013.01)

(58) Field of Classification Search
CPC ...... G06F 3/1288; G06F 21/31; G06F 3/1285; G06F 3/1291; G06F 2221/2129; G06F 3/1237; G06F 3/129; G06F 3/1293

USPC . 358/1.15, 1.14, 1.9, 402, 474, 498; 399/79, 88; 709/203, 206, 217, 219, 223, 709/229
See application file for complete search history.

(56) References Cited

U.S. PATENT DOCUMENTS

| | | | |
|---|---|---|---|
| 8,819,799 B2* | 8/2014 | Oguma | G06F 21/41 726/8 |
| 8,902,442 B2* | 12/2014 | Oguma | G06K 15/1806 358/1.13 |
| 8,992,374 B2* | 3/2015 | Shibamura | F16H 3/66 475/276 |
| 9,036,179 B2* | 5/2015 | Numata | G06K 15/4095 358/1.14 |
| 9,229,666 B2* | 1/2016 | Oguma | G06F 3/1231 |
| 9,305,255 B2* | 4/2016 | Sun | G09F 3/0297 |
| 9,367,274 B2* | 6/2016 | Oguma | G06F 3/1207 |
| 9,374,494 B2* | 6/2016 | Kubo | H04N 5/23245 |
| 9,460,372 B2* | 10/2016 | Oguma | G06K 15/1821 |
| 2009/0268227 A1* | 10/2009 | Kaneko | G06F 3/1222 358/1.14 |

(Continued)

FOREIGN PATENT DOCUMENTS

JP 2011-81741 A 4/2011

*Primary Examiner* — Negussie Worku
(74) *Attorney, Agent, or Firm* — Stein IP, LLC (57) ABSTRACT

A function providing system for providing a function to an image forming apparatus includes a server and a function relaying circuit. The server provides a function for the image forming apparatus. The function relaying circuit is located outside the image forming apparatus, the function relaying circuit providing the function to the image forming apparatus. The function relaying circuit uses the function corresponding to an instruction from the image forming apparatus, and the function relaying circuit transmits a use result of the function to the image forming apparatus.

8 Claims, 7 Drawing Sheets

(56) References Cited

U.S. PATENT DOCUMENTS

| | | | |
|---|---|---|---|
| 2013/0088738 A1* | 4/2013 | Tajima | G06F 3/1204 358/1.14 |
| 2014/0198336 A1* | 7/2014 | Numata | G06K 15/4095 358/1.14 |
| 2014/0376027 A1* | 12/2014 | Adachi | G06F 21/608 358/1.14 |
| 2015/0098112 A1* | 4/2015 | Kawai | H04N 1/4413 358/1.15 |
| 2015/0199155 A1* | 7/2015 | Cho | G06F 3/1222 358/1.14 |
| 2016/0034801 A1* | 2/2016 | Kato | G06K 15/4095 358/1.14 |
| 2016/0150125 A1* | 5/2016 | Yano | H04N 1/4433 358/1.14 |

* cited by examiner

FIG. 7

FUNCTION PROVIDING SYSTEM AND RECORDING MEDIUM FOR USING FUNCTIONS PROVIDED BY SERVER

INCORPORATION BY REFERENCE

This application is based upon, and claims the benefit of priority from, corresponding Japanese Patent Application No. 2015-039559 filed in the Japan Patent Office on Feb. 27, 2015, the entire contents of which are incorporated herein by reference.

BACKGROUND

Unless otherwise indicated herein, the description in this section is not prior art to the claims in this application and is not admitted to be prior art by inclusion in this section.

There has been known a function providing system that causes an image forming apparatus to use functions provided by a server.

SUMMARY

A function providing system according to one aspect of the disclosure provides a function to an image forming apparatus. The function providing system includes a server and a function relaying circuit. The server provides a function for the image forming apparatus. The function relaying circuit is located outside the image forming apparatus, the function relaying circuit providing the function to the image forming apparatus. The function relaying circuit uses the function corresponding to an instruction from the image forming apparatus, and the function relaying circuit transmits a use result of the function to the image forming apparatus.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a description will be given of a configuration of a printing system according to the embodiment.

Figure 1:
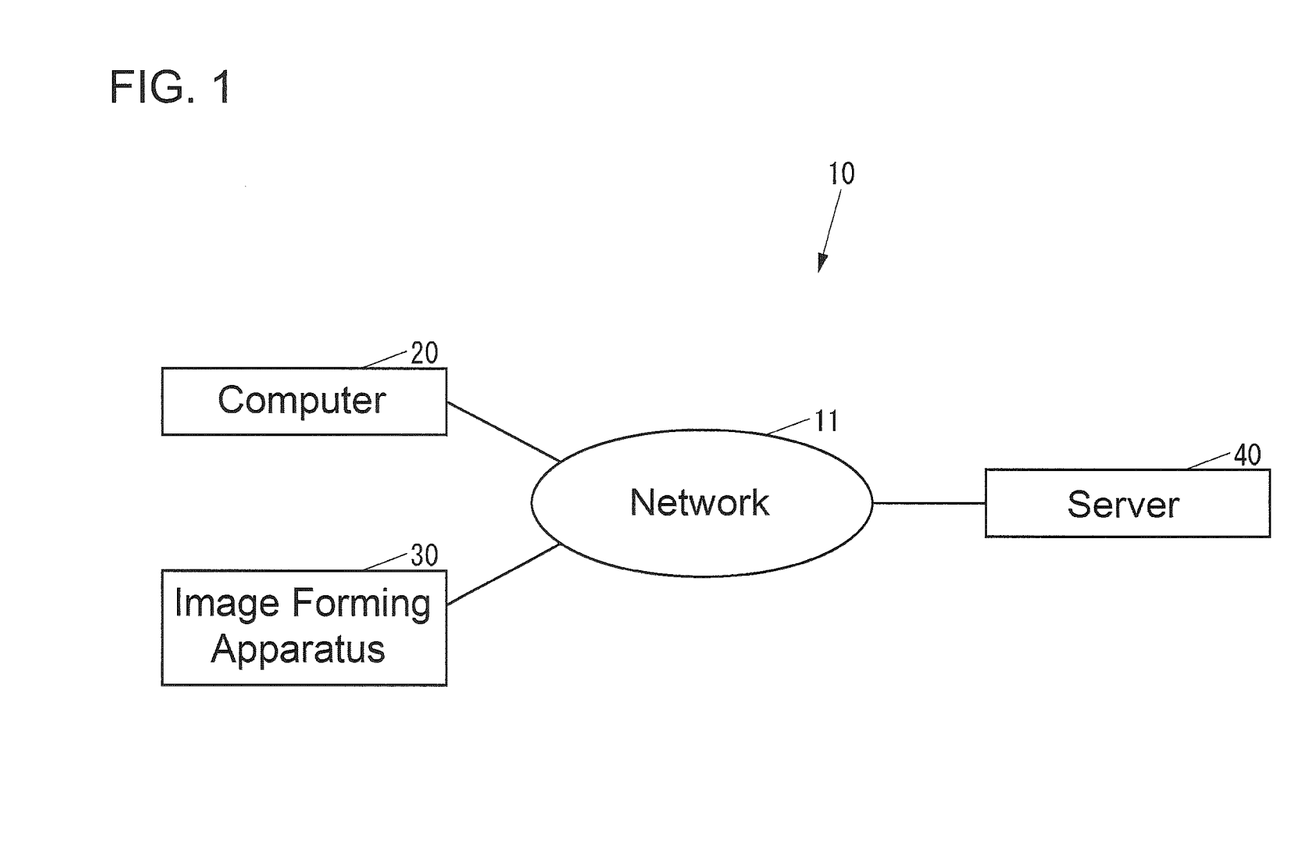
FIG. 1 illustrates a block diagram of a printing system according to one embodiment of the disclosure.

FIG. 1 is a block diagram illustrating a printing system 10 according to the embodiment.

As illustrated in FIG. 1, the printing system 10 includes a computer 20 such as a Personal Computer (PC), an image forming apparatus 30, and a server 40. The computer 20 generates print data. The image forming apparatus 30 performs a print job based on the print data. The server 40 is a function providing system that provides functions for the image forming apparatus.

While the printing system 10 includes many computers other than the computer 20, for ease of understanding, the following omits the description about the computers other than the computer 20. Similarly, while the printing system 10 includes many image forming apparatuses other than the image forming apparatus 30, for ease of understanding, the following omits the description about the image forming apparatuses other than the image forming apparatus 30.

The computer 20 and the server 40 are connectable to one another via a network 11, for example, a Local Area Network (LAN), Internet, and similar network. Similarly, the image forming apparatus 30 and the server 40 are connectable to one another via the network 11, for example, a LAN, Internet, and similar network.

The image forming apparatus 30 is, for example, a Multifunction Peripheral (MFP) and a printer-only machine.

The server 40 is configured of one or more computers such as a PC.

Figure 2:
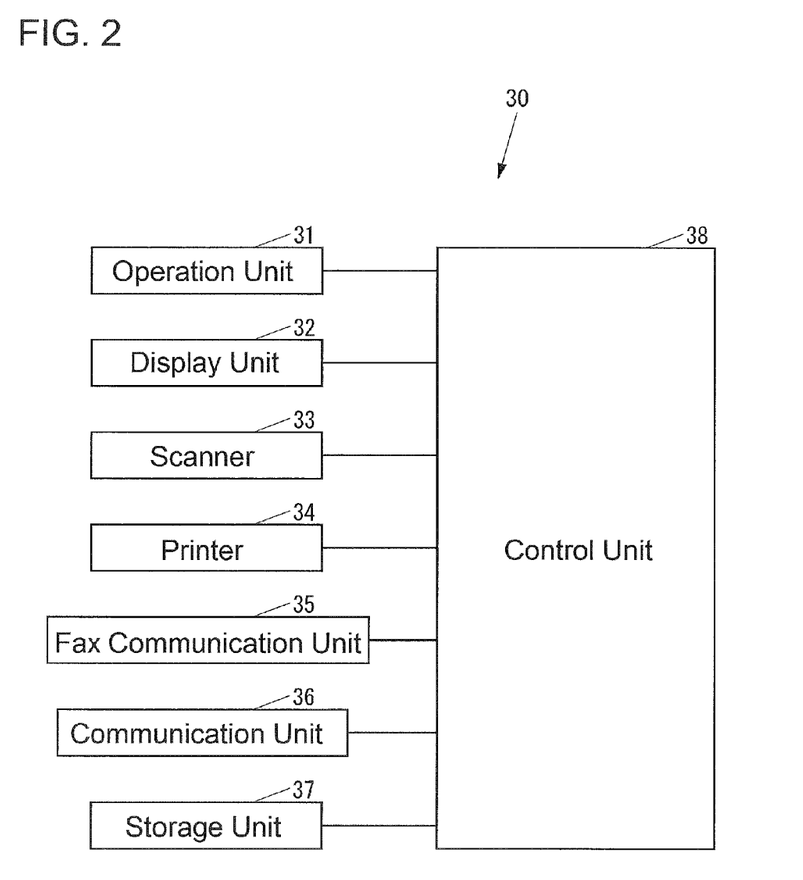
FIG. 2 illustrates a block diagram of an image forming apparatus according to the one embodiment.

FIG. 2 is a block diagram illustrating the image forming apparatus 30.

As illustrated in FIG. 2, the image forming apparatus 30 includes an operation unit 31, a display unit 32, a scanner 33, a printer 34, a fax communication unit 35, a communication unit 36, a storage unit 37, and a control unit 38. The operation unit 31 is an input device such as a button to which various operations by a user are input. The display unit 32 is a display device such as a Liquid Crystal Display (LCD) that displays various pieces of information. The scanner 33 is a reading device that reads image data from a document. The printer 34 is a printing device that performs printing on a recording medium such as a paper sheet. The fax communication unit 35 is a fax device that performs fax communications with an external facsimile device (not illustrated) via a communication line such as a dial-up line. The communication unit 36 is a communication device that communicates with an external device via the network 11. The storage unit 37 is a storage device such as an Electrically Erasable Programmable Read Only Memory (EEPROM) and a Hard Disk Drive (HDD), which stores various data. The control unit 38 controls the entire image forming apparatus 30.

The control unit 38 includes, for example, a Central Processing Unit (CPU), a Read Only Memory (ROM), and a Random Access Memory (RAM). The ROM stores programs and various data. The RAM is used as a work area for the CPU. The CPU executes the program stored in the ROM or the storage unit 37.

Figure 3:
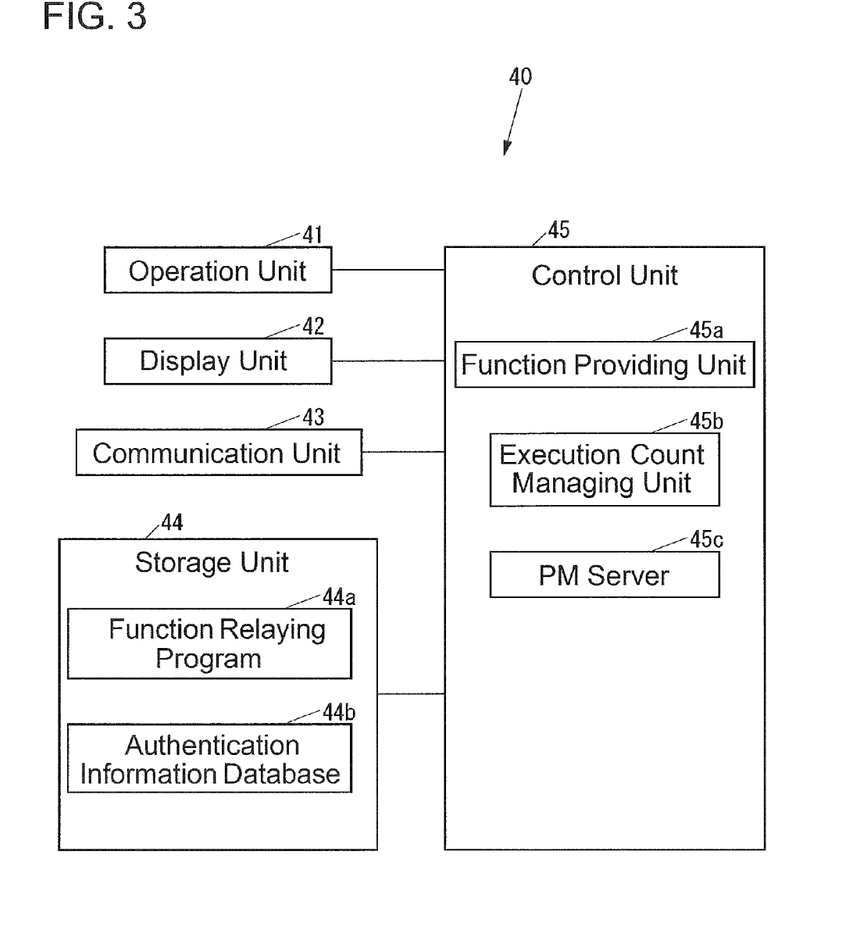
FIG. 3 illustrates a block diagram a server according to the one embodiment.

FIG. 3 is a block diagram illustrating the server 40.

As illustrated in FIG. 3, the server 40 includes an operation unit 41, a display unit 42, a communication unit 43, a storage unit 44, and a control unit 45. The operation unit 41 is an input device such as a button to which various operations by a user are input. The display unit 42 is a display device such as an LCD that displays various pieces of information. The communication unit 43 is a communication device that communicates with an external device. The storage unit 44 is a storage device such as a HDD that stores various data. The control unit 45 controls the entire server 40.

The storage unit 44 stores a function relaying program 44a that provides functions provided by the server 40 to the image forming apparatus 30. The function relaying program 44a may be installed on the server 40 at production stage of the server 40, may be additionally installed on the server 40 from a storage medium such as a Compact Disk (CD), a Digital Versatile Disk (DVD), and similar medium, and may also be additionally installed on the server 40 over the network 11. The function relaying program 44a is preferably provided as a Software Development Kit (SDK).

The storage unit 44 stores an authentication information database 44b for the management of user authentication information.

Figure 4:
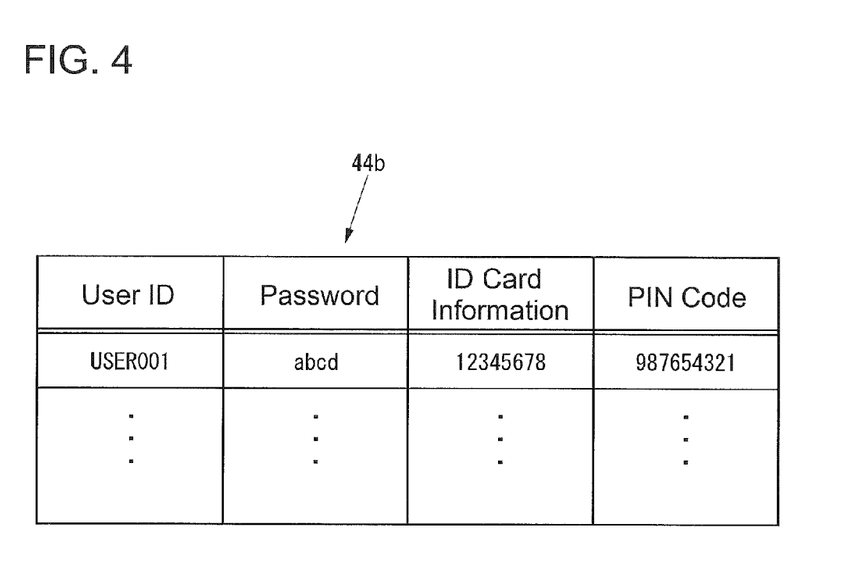
FIG. 4 illustrates a tabular diagram of an exemplary authentication information database according to the one embodiment.

FIG. 4 illustrates an exemplary authentication information database 44b.

As illustrated in FIG. 4, the authentication information database 44b stores a user ID as user identification information, a user password, ID card information of the user, and a Personal Identification Number (PIN) code of the user by each user.

The control unit 45 illustrated in FIG. 3 includes, for example, a CPU, a ROM, which stores programs and various data, and a RAM, which is used as a work area for the CPU. The CPU executes the program stored in the ROM or the storage unit 44.

The control unit 45 executes the program stored in the ROM or the storage unit 44 to function as a function providing unit 45a and an execution count managing unit (also referred to as an execution count managing circuit) 45b. The function providing unit 45a provides the function for the image forming apparatus 30. The execution count managing unit 45b manages the execution count of a specified process with use of the image forming apparatus 30 by the user of the image forming apparatus 30.

The control unit 45 performs the function relaying program 44a stored in the storage unit 44 to function as a Policy Manager (PM) server 45c. The PM server 45c is a function relaying unit (also referred to as a function relaying circuit) that provides the function provided by the function providing unit 45a to the image forming apparatus 30.

Figure 5:
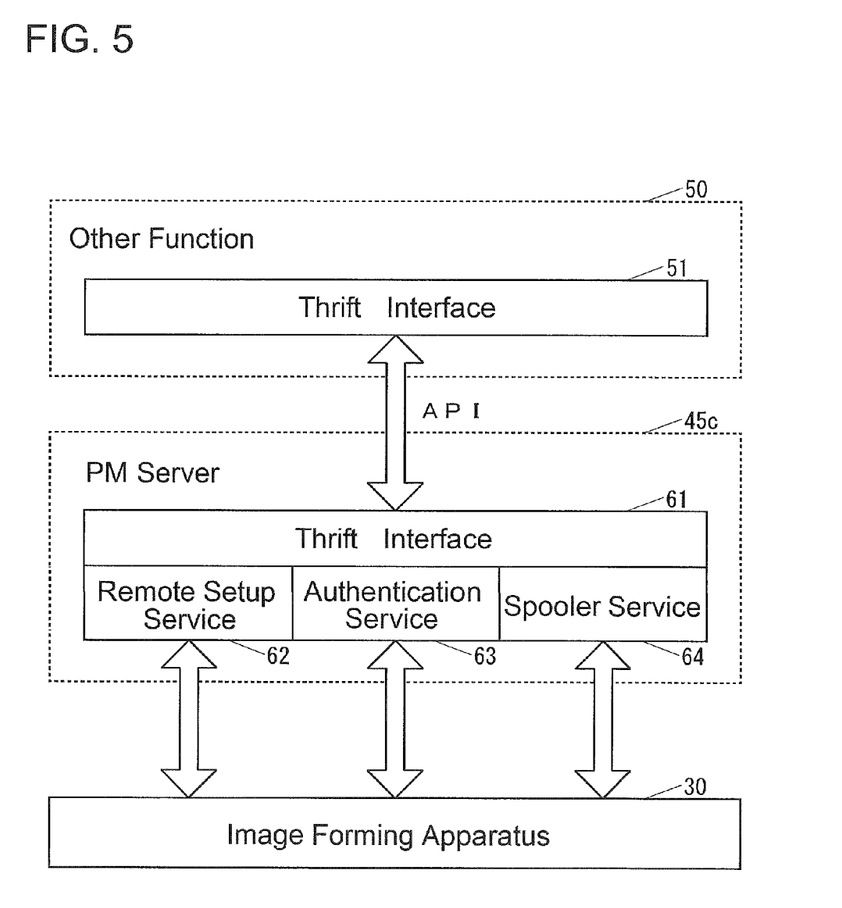
FIG. 5 illustrates a block diagram of a PM server according to the one embodiment in detail.

FIG. 5 illustrates the PM server 45c in detail.

As illustrated in FIG. 5, the PM server 45c includes a thrift interface (Thrift Interface) 61 for the cooperation with another function (hereinafter referred to as an other function) 50 in the server 40 (see FIG. 3) by an Application Program Interface (API) call. Here, the other function 50 includes, for example, the function providing unit 45a (see FIG. 3).

The PM server 45c includes a remote setup (Remote Setup) service 62 to perform the setting of the image forming apparatus 30 by a request that is based on an instruction input from the operation unit 41 (see FIG. 3) or the communication unit 43 (see FIG. 3), from the other function 50, and via the Thrift Interface 61.

The PM server 45c includes an authentication service 63 to provide an authentication function for the authentication of the user of the image forming apparatus 30 to the image forming apparatus 30 among the functions provided by the function providing unit 45a. The authentication service 63 uses the authentication function of the other function 50 via the Thrift Interface 61 corresponding to the instruction from the image forming apparatus 30 via the communication unit 43. At the same time, the authentication service 63 transmits the use result of the authentication function to the image forming apparatus 30 via the communication unit 43.

The PM server 45c includes a spooler (Spooler) service 64 to provide a print data providing function, which provides print data managed by the server 40 to the user, to the image forming apparatus 30 among the functions provided by the function providing unit 45a. The Spooler service 64 uses the print data providing function of the other function 50 via the Thrift Interface 61 corresponding to the instruction from the image forming apparatus 30 via the communication unit 43. At the same time, the Spooler service 64 transmits the use result of the print data providing function to the image forming apparatus 30 via the communication unit 43.

The other function 50 includes a Thrift Interface 51 for the cooperation with the PM server 45c by an API call.

The Thrift Interface 51 and the Thrift Interface 61 are achieved by, for example, "Apache (registered trademark) Thrift" that provides an interoperability between different platforms or different languages. Accordingly, the printing system 10 does not require an interface with the image forming apparatus 30 to be generated by each function among the other functions 50 in the server 40.

Next, a description will be provided to the performance of the printing system 10.

First, a description will be provided to a performance of the computer 20 when the computer 20 transmits the print data to the server 40.

When the computer 20 receives an instruction to transmit the print data to the server 40 from the user, the computer 20 transmits the print data to the server 40 associating with the user ID.

Accordingly, the function providing unit 45a of the server 40 causes the storage unit 44 to store the print data, which is transmitted from the computer 20, associating with the user ID, which is transmitted from the computer 20 associated with this print data.

Next, a description will be provided to the performance of the printing system 10 when the user logs in the server 40 from the image forming apparatus 30.

Figure 6:
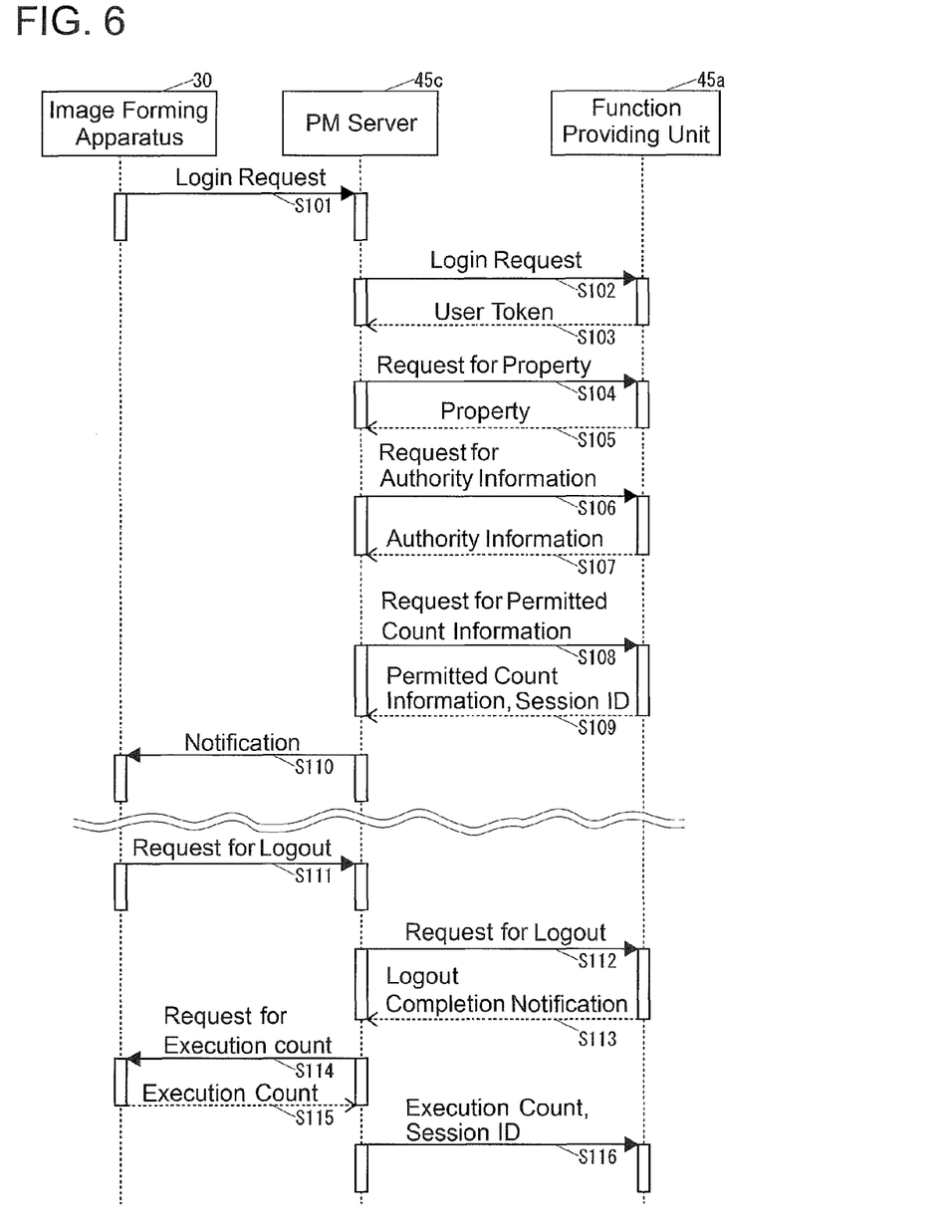
FIG. 6 illustrates a sequence diagram of a performance of a printing system according to the one embodiment when a user logs in the server from the image forming apparatus.

FIG. 6 is a sequence diagram illustrating the performance of the printing system 10 when the user logs in the server 40 from the image forming apparatus 30.

When the control unit 38 of the image forming apparatus 30 receives an instruction to login the server 40 via the operation unit 31, as illustrated in FIG. 6, the control unit 38 transmits the request for the user login to the server 40 (Step S101). This request includes authentication information input by the user. For example, as the pattern of the authentication information, ID card information that is obtained by an ID card reader (not illustrated), the combination of the ID card information and the password, the PIN code, the combination of the ID card information and the PIN code, and the combination of the user ID and the password are acceptable.

When the request for the user login is transmitted from the image forming apparatus 30 at Step S101, the PM server 45c of the server 40 requests the user login to the function providing unit 45a (Step S102). This request includes the authentication information transmitted at Step S101. When the authentication information included in the request at Step S102 is included in the authentication information database 44b, the function providing unit 45a determines that the user authentication has been succeeded, and permits the user login. On the other hand, when the authentication information included in the request at Step S102 is not included in the authentication information database 44b, the function providing unit 45a determines that the user authentication has been failed, and does not permit the user login.

When the function providing unit 45a permits the user login, the function providing unit 45a provides a user token associated with the login permitted user to the PM server 45c (Step S103). Accordingly, after receiving the user token, the PM server 45c uses the user token to perform the various requests to the function providing unit 45a until the user logs out.

After the process at Step S103, the PM server 45c requests the user property (Step S104). Accordingly, the function providing unit 45a provides the user property to the PM server 45c (Step S105). The user property includes, for example, the user name displayed on the display unit 32 of the image forming apparatus 30, an e-mail address of the user, and a folder path for the user, for example, in the server 40. Here, the e-mail address and the folder path are used as, for example, one of the candidates of the transmission destination of an image read by the scanner 33 of the image forming apparatus 30.

After the process at Step S105, the PM server 45c requests the information of the user authority (hereinafter referred to as "authority information") (Step S106). Accordingly, the function providing unit 45a provides the authority information of the user to the PM server 45c (Step S107). The authority information includes, for example, information whether or not the following authorities are permitted; a print authority to print based on the print data, which is input to the image forming apparatus 30 from outside the image forming apparatus 30, by the printer 34, a copy authority to print based on the image data read by the scanner 33 by the printer 34, a transmitting authority to transmit the image data read by the scanner 33 to outside the image forming apparatus 30, an accumulating authority to accumulate the image data read by the scanner 33 in the storage unit 37, a USB accumulating authority to accumulate the image data read by the scanner 33 in a Universal Serial Bus (USB) memory (not illustrated), and a FAX authority for a facsimile transmission of the image data read by the scanner 33 via the fax communication unit 35.

After the process at Step S107, the PM server 45c requests information of various counts permitted to the user (hereinafter referred to as "permitted count information") (Step S108). Accordingly, the function providing unit 45a provides the permitted count information of the user and a session ID as identification information of a session started by this time login to the PM server 45c (Step S109). The permitted count information includes, for example, following permitted counts; a monochrome printing permitted count as a permitted count of pages for the monochrome printing by the printer 34 based on the print data input to the image forming apparatus 30 from outside the image forming apparatus 30, a color printing permitted count as a permitted count of pages for the color printing by the printer 34 based on the print data input to the image forming apparatus 30 from outside the image forming apparatus 30, a monochrome copying permitted count as a permitted count of pages for the monochrome printing by the printer 34 based on the image data read by the scanner 33, and a color copying permitted count as a permitted count of pages for the color printing by the printer 34 based on the image data read by the scanner 33.

After the process at Step S109, the PM server 45c informs the success of the user login, the user property obtained at Step S105, the authority information of the user obtained at Step S107, and the permitted count information of the user obtained at Step S109, and the session ID of the image forming apparatus 30 (Step S110). Accordingly, the image forming apparatus 30 can provide various functions such as the printing and copying to the user within the range indicated by the authority information and the permitted count information, which are provided by the PM server 45c. When the image forming apparatus 30 requires the user property in providing the functions to the user, the image forming apparatus 30 can use the property provided by the PM server 45c.

The image forming apparatus 30 starts to store the execution count of the specific process by the user with use of the image forming apparatus 30 in this session in the storage unit 37 associating with the session ID provided by the PM server 45c. The execution count of the specific process includes, for example, following execution counts; a monochrome printing execution count of the monochrome printing by the printer 34 based on the print data input to the image forming apparatus 30 from outside the image forming apparatus 30, a color printing execution count of the color printing by the printer 34 based on the print data input to the image forming apparatus 30 from outside the image forming apparatus 30, a monochrome copying execution count of the monochrome printing by the printer 34 based on the image data read by the scanner 33, a color copying execution count of the color printing by the printer 34 based on the image data read by the scanner 33, a scan execution count reading the image data by the scanner 33, and a facsimile transmission execution count of the facsimile transmission of the image data read by the scanner 33 via the fax communication unit 35.

When the control unit 38 of the image forming apparatus 30 receives an instruction to logout from the server 40 via the operation unit 31, the control unit 38 transmits the request for the user logout to the server 40 (Step S111).

When the PM server 45c of the server 40 receives the request for the user logout from the image forming apparatus 30 at Step S111, the PM server 45c requests the user logout to the function providing unit 45a (Step S112). Accordingly, after making the user logout, the function providing unit 45a informs the complete of the logout of the PM server 45c (Step S113).

After the process at Step S113, the PM server 45c requests the execution count of the specific process by the user with use of the image forming apparatus 30 in this session to the image forming apparatus 30 (Step S114). This request includes the session ID. Accordingly, the control unit 38 of the image forming apparatus 30 transmits the execution count of the specific process by the user with use of the image forming apparatus 30 in this session to the server 40 (Step S115).

After the process at Step S115, the PM server 45c provides the execution count obtained from the image forming apparatus 30 to the function providing unit 45a with the session ID (Step S116). Accordingly, the execution count managing unit 45b manages the execution count provided from the PM server 45c at Step S116 as the execution count of the user corresponding to the session ID provided from the PM server 45c at Step S116.

As described above, the image forming apparatus 30 and the server 40 manage the execution count with the session ID. Accordingly, as illustrated in FIG. 6, the execution count managing unit 45b can manage the execution count other than the case where the user logs out properly. For example, if the power source of the image forming apparatus 30 is turned off during the session, the PM server 45c can obtain the execution count in the session from the image forming apparatus 30 using the session ID when the power source of the image forming apparatus 30 is turned on again.

Next, a description will be given of the performance of the printing system 10 when the image forming apparatus 30 performs a pull print.

The user can perform a pull print, where the image forming apparatus 30 performs the print of the print data stored in the server 40, after the process at Step S110 until the user logs out.

Figure 7:
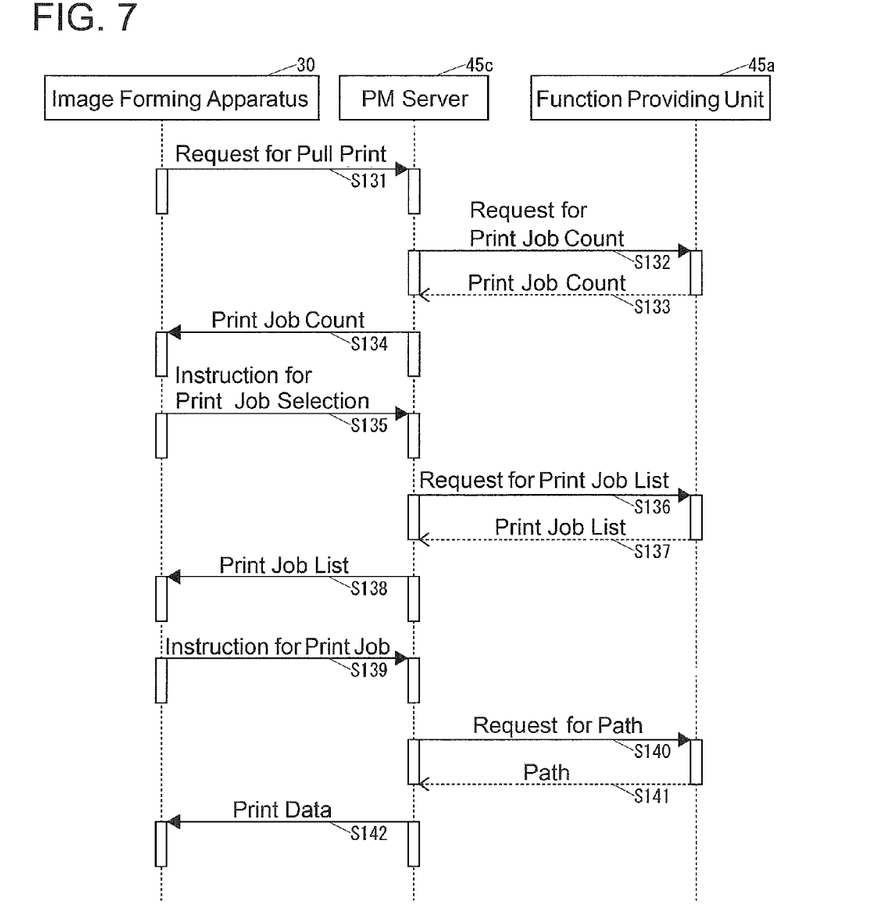
FIG. 7 illustrates a sequence diagram of a performance of the printing system according to the one embodiment when the image forming apparatus performs pull print.

FIG. 7 is a sequence diagram illustrating the performance of the printing system 10 when the image forming apparatus 30 performs the pull print.

As illustrated in FIG. 7, when the control unit 38 of the image forming apparatus 30 receives an instruction for the pull print via the operation unit 31, the control unit 38 transmits the request for the pull print to the server 40 (Step S131).

When the PM server 45c of the server 40 receives the request for the pull print from the image forming apparatus 30 at Step S131, the PM server 45c requests the count of the print data managed by the server 40 with respect to the user (hereinafter referred to as "print job count") to the function providing unit 45a (Step S132). Accordingly, the function providing unit 45a provides the print job count of the user to the PM server 45c (Step S133). Then, the PM server 45c transmits the print job count provided from the function providing unit 45a at Step S133 to the image forming apparatus 30 (Step S134). Accordingly, the image forming apparatus 30 displays the print job count transmitted from the PM server 45c on the display unit 32 to be in a state where the image forming apparatus 30 is acceptable any of the instruction of; to perform all the print job based on the print data managed by the server 40 with respect to the user, or to select the print job to be performed among the print jobs based on the print data managed by the server 40 with respect to the user.

When the PM server 45c receives the instruction to select the print job to be performed from the image forming apparatus 30 (Step S135), the PM server 45c requests a list of the print data, which is managed by the server 40 with respect to the user, (hereinafter referred to as "print job list") to the function providing unit 45a (Step S136). Accordingly, the function providing unit 45a provides the print job list of the user to the PM server 45c (Step S137). Then, the PM server 45c transmits the print job list provided from the function providing unit 45a at Step S137 to the image forming apparatus 30 (Step S138). Accordingly, the image forming apparatus 30 displays the print job list transmitted from the PM server 45c on the display unit 32 to be in a state where the image forming apparatus 30 is acceptable the designation of the print job to be performed among the print jobs based on the print data managed by the server 40 with respect to the user.

When the PM server 45c receives the instruction of the print job to be performed from the image forming apparatus 30 (Step S139), the PM server 45c requests a print data path of the instructed print job to the function providing unit 45a (Step S140). Accordingly, the function providing unit 45a provides the required print data path to the PM server 45c (Step S141). The PM server 45c obtains the print data by using the path provided from the function providing unit 45a at Step S141, and transmits the obtained print data to the image forming apparatus 30 (Step S142). Accordingly, the image forming apparatus 30 performs the print by the printer 34 based on the print data transmitted from the PM server 45c.

The image forming apparatus 30 transmits the state of the print execution to the PM server 45c at the specific timing. Then, the PM server 45c informs the state transmitted from the image forming apparatus 30 of the function providing unit 45a. Accordingly, the function providing unit 45a can detect the state of the pull print execution.

A case where the image forming apparatus 30 instructs to select the print job to be performed to the server 40 is described above. When the image forming apparatus 30 gives the instruction to perform all the print job based on the print data, which is managed by the server 40 with respect to the user, to the server 40, the PM server 45c transmits all the print data, which is managed by the server 40 with respect to the user, to the image forming apparatus 30 without using the print job list.

In the above description, the server 40 transmits the print job count to the image forming apparatus 30 before transmitting the print job list. However, the server 40 may transmit the print job list to the image forming apparatus 30 without transmitting the print job count from the server 40 to the image forming apparatus 30. In this case, the processes at Step S132 to Step S135 are not performed.

Further, a configuration that the server 40 transmits all the print data, which is managed by the server 40 with respect to the user, to the image forming apparatus 30 without transmitting the print job list as well from the server 40 to the image forming apparatus 30 may be employed. In this case, the processes at Step S136 to Step S139 are not performed as well.

As described above, the server 40 uses the functions provided by the server 40 with the PM server 45c (Step S102, S104, S106, S108, S132, S136, and S140) corresponding to the instruction from the image forming apparatus 30 (Step S101, S131, S135, and S139). At the same time, the server 40 transmits the use result of the functions by the PM server 45c to the image forming apparatus 30 by the PM server 45c (Step S110, S134, S138, and S142). This ensures the server 40 to cause the image forming apparatus 30 to use the functions provided by the server 40 corresponding to the instruction from the image forming apparatus 30. That is, the server 40 can make the function, which is used by the image forming apparatus 30 among the functions of the server 40, SDK (asset) with use of the PM server 45c.

The server 40 can cause the image forming apparatus 30 to use the authentication function provided by the server 40 corresponding to the instruction from the image forming apparatus 30 (Step S101).

The server 40 can cause the image forming apparatus 30 to use the print data providing function provided by the server 40 corresponding to the instruction from the image forming apparatus 30 (Step S131, S135, and S139).

The server 40 can obtain the execution count of the specific process by the user with use of the image forming apparatus 30 by each session from the image forming apparatus 30 (Step S114 to S116).

The function providing system of the disclosure includes the PM server 45c in the server 40. Then, the function providing system of the disclosure can be achieved with the simple configuration. The PM server 45c may be achieved by the computer other than the server 40.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A printing system comprising:
a computer for generating print data;
an image forming apparatus for performing a print job based on the print data; and
a server for providing a function for the image forming apparatus, which are connected to a network,
the server comprising:
a storage unit as a Hard Disk Drive (HDD) for storing a function relaying program as a Software Development Kit (SDK) that provides the function provided by the server to the image forming apparatus; and
a control unit as a Central Processing Unit (CPU) for performing the function relaying program stored in the storage unit to function as a Policy Manager (PM) server,
wherein the PM server for providing the function provided by the server to the image forming apparatus includes:
a thrift interface for cooperating with another function in the server by an Application Program Interface (API) call;
a remote setup service for performing a setting of the image forming apparatus by a request from the other function in the server via the thrift interface;
an authentication service for providing an authentication function for authenticating a user of the image forming apparatus to the image forming apparatus, wherein the authentication service i) uses the authentication function of the other function via the thrift interface corresponding to an instruction from the image forming apparatus, and ii) transmits a use result of the authentication function to the image forming apparatus; and
a spooler service for providing a print data providing function for providing the print data managed by the server to the user of the image forming apparatus, wherein the spooler service i) uses the print data providing function of the other function via the thrift interface corresponding to the instruction from the image forming apparatus, and ii) transmits the use result of the print data providing function to the image forming apparatus.

2. The printing system according to claim 1, wherein:
the PM server requests a login of the user to the server, when a request for the login of the user is transmitted from the image forming apparatus; and
the server provides a user token associated with the user to the PM server, if an authentication of the user has been successful.

3. The printing system according to claim 2, wherein:
the PM server i) requests to the server a user property including a user name displayed on the image forming apparatus, an e-mail address of the user, and a folder path for the user in the server, and ii) provides the user property to the image forming apparatus; and
the image forming apparatus uses the user property, when requiring the user property in providing the function to the user.

4. The printing system according to claim 2, wherein:
the PM server i) requests to the server authority information, permitted count information, and a session ID as identification information of a session started by the login of the user, and ii) provides to the image forming apparatus the authority information, the permitted count information, and the session ID;
the image forming apparatus provides the function of a specific process including a printing and a copying to the user within the authority information and the permitted count information;
the server manages an execution count of the specific process by the user with use of the image forming apparatus;
the PM server obtains, from the image forming apparatus, the execution count in the session started by the login of the user; and
the server manages the execution count of the user provided by the PM server of the sessions.

5. A non-transitory computer-readable recording medium storing a function relaying program as a Software Development Kit (SDK) to provide a function in a server to an image forming apparatus, the function relaying program causing a computer in the server to function as a Policy Manager (PM) server, the PM server comprising:
a thrift interface for cooperating with another function in the server by an Application Program Interface (API) call;
a remote setup service for performing a setting of the image forming apparatus by a request from the other function in the server via the thrift interface;
an authentication service for providing an authentication function for authenticating a user of the image forming apparatus to the image forming apparatus, wherein the authentication service i) uses the authentication function of the other function via the thrift interface corresponding to an instruction from the image forming apparatus, and ii) transmits a use result of the authentication function to the image forming apparatus; and
a spooler service for providing a print data providing function for providing print data managed by the server to the user of the image forming apparatus, wherein the spooler service i) uses the print data providing function of the other function via the thrift interface corresponding to the instruction from the image forming apparatus, and ii) transmits the use result of the print data providing function to the image forming apparatus.

6. The non-transitory computer-readable recording medium according to claim 5, wherein:
the PM server requests a login of the user to the server, when a request for the login of the user is transmitted from the image forming apparatus; and
the server provides a user token associated with the user to the PM server, if an authentication of the user has been successful.

7. The non-transitory computer-readable recording medium according to claim 6, wherein:
the PM server i) requests to the server a user property including a user name displayed on the image forming apparatus, an e-mail address of the user, and a folder path for the user in the server, and ii) provides the user property to the image forming apparatus; and the image forming apparatus uses the user property, when requiring the user property in providing the function to the user.

8. The non-transitory computer-readable recording medium according to claim 6, wherein:
- the PM server i) requests to the server authority information, permitted count information, and a session ID as identification information of a session started by the login of the user, and ii) provides to the image forming apparatus the authority information, the permitted count information, and the session ID;
- the image forming apparatus provides the function of a specific process including a printing and a copying to the user within the authority information and the permitted count information;
- the server manages an execution count of the specific process by the user with use of the image forming apparatus;
- the PM server obtains, from the image forming apparatus, the execution count in the session started by the login of the user; and
- the server manages the execution count of the user provided by the PM server of the session.

\* \* \* \* \*